(12) United States Patent
Düesberg et al.

(10) Patent No.: US 11,515,580 B2
(45) Date of Patent: Nov. 29, 2022

(54) ENERGY STORAGE SYSTEM INCLUDING AN ENERGY STORE THAT IS SWITCHABLE INTO A PASSIVE STATE

(71) Applicant: Robert Bosch GmbH, Stuttgart (DE)

(72) Inventors: Christian Düesberg, Heede (DE); Du Yonggang, Frankfurt am Main (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 16/641,857

(22) PCT Filed: Aug. 23, 2018

(86) PCT No.: PCT/EP2018/072763
§ 371 (c)(1),
(2) Date: Feb. 25, 2020

(87) PCT Pub. No.: WO2019/042858
PCT Pub. Date: Mar. 7, 2019

(65) Prior Publication Data
US 2020/0220228 A1    Jul. 9, 2020

(30) Foreign Application Priority Data
Aug. 28, 2017 (DE) .......................... 102017119705.2

(51) Int. Cl.
*H01M 10/44* (2006.01)
*H02J 7/00* (2006.01)
*H01M 10/42* (2006.01)

(52) U.S. Cl.
CPC ......... *H01M 10/44* (2013.01); *H01M 10/425* (2013.01); *H02J 7/0042* (2013.01); *H02J 7/00711* (2020.01); *H01M 2220/20* (2013.01)

(58) Field of Classification Search
CPC .... H02J 7/0042; H02J 7/00711; H01M 10/44; H01M 10/425; H01M 2220/20
USPC ......................................................... 320/134
See application file for complete search history.

(56) References Cited

U.S. PATENT DOCUMENTS

| 5,675,232 A | * | 10/1997 | Koenck | ............. | H02J 7/007182 307/150 |
| 2006/0290321 A1 | * | 12/2006 | Bhogal | .................... | G06F 1/263 320/128 |
| 2010/0055549 A1 | | 3/2010 | Corder | | |
| 2011/0045323 A1 | | 2/2011 | Ooi et al. | | |

(Continued)

OTHER PUBLICATIONS

International Search Report for PCT/EP2018/072763, dated Oct. 1, 2018.

*Primary Examiner* — Nathaniel R Pelton
(74) *Attorney, Agent, or Firm* — Norton Rose Fulbright US LLP; Gerard Messina (57) ABSTRACT

An energy store is described. The energy store includes at least one storage cell and one storage cell management system, which includes a charge distribution circuit for monitoring the charging and discharging of the storage cell, the energy store being shiftable by the storage cell management system into an active state or into a passive state, the storage cell management system including a logic circuit, including a switch for switching between the active state and the passive state and the switch being switchable by inserting the energy store into a guide. An energy storage system including such an energy store and a guide, is also described.

14 Claims, 6 Drawing Sheets

(56) References Cited

U.S. PATENT DOCUMENTS

| | | | |
|---|---|---|---|
| 2015/0188333 A1* | 7/2015 | Zhang | H01M 50/543 |
| | | | 173/217 |
| 2016/0332530 A1* | 11/2016 | Roeder | B60L 3/0046 |
| 2017/0045926 A1* | 2/2017 | Powell | G06F 1/3296 |
| 2017/0222468 A1* | 8/2017 | Schennum | H02J 7/0029 |
| 2018/0370378 A1* | 12/2018 | Konishi | H02J 7/0013 |
| 2019/0020072 A1* | 1/2019 | Fauteux | H01M 50/502 |

\* cited by examiner

ENERGY STORAGE SYSTEM INCLUDING AN ENERGY STORE THAT IS SWITCHABLE INTO A PASSIVE STATE

FIELD

The present invention relates to an energy store including at least one storage cell and one storage cell management system, which includes a charge distribution circuit for monitoring the charging and discharging of the storage cell, the energy store being shiftable by the storage cell management system into an active state or into a passive state. The present invention further relates to an energy storage system including such an energy store.

BACKGROUND INFORMATION

The term energy store below relates to electrical energy stores. Such an energy store may, for example, be a battery, which includes one or multiple battery cells. Rechargeable batteries, namely accumulators, are also referred to below as batteries.

Energy storage systems, in which a battery including one or multiple cell(s) is/are inserted into a holder, are conventional. In this system, an electrical contact is established between the holder and the battery. Electrical systems connected to the holder discharge the battery via electrical contacts that exist between the battery and the holder.

Such a conventional battery is chargeable via one or multiple charging connection(s). The charging and/or discharging of the battery are/is controlled by a storage cell management system. Such storage cell management systems have a certain separate energy requirement.

Conventionally, these storage cell management systems are shifted into a deep sleep state with the aid of an external input, for example, an electrical signal generated by a switch, in which an energy requirement is minimized. In the conventional energy system, the deep sleep state is terminated by connecting the battery, for example, to a charging device.

Conventional energy storage systems therefore require the active switching of the storage cell management system into an awakened state or a deep sleep state. If the deep sleep state is not activated, the battery is continuously discharged as a result of the energy required by the storage cell management system. Moreover, the shifting of the circuit of the storage cell management system and thus of the battery into the desired state is complex and requires an additional handling effort by the user.

SUMMARY

An object of the present invention is to eliminate these and other disadvantages and to provide an energy storage system including an energy store, which includes a low self-discharging and is switchable in a user-friendly manner between an awakened state and a deep-sleep state as a function of the intended purpose of the energy storage system.

Advantageous embodiments of the present invention are described herein.

In accordance with the present invention, the object may be achieved in an energy store including at least one storage cell and one storage cell management system, which includes a charge distribution circuit for monitoring the charging and discharging of the storage cell, the energy store being shiftable by the storage cell management system into an active state or into a passive state, in that the storage cell management system includes a logic circuit having a switch for switching between the passive and the active state, and the switch is switchable by inserting the energy store into a guide.

With this example embodiment, the energy store is shiftable via the logical circuit automatically into the active state when the energy store is inserted into the guide. An external application of voltage is therefore unnecessary. Similarly, the energy store is shiftable into the passive state when the energy store is withdrawn from the guide. By providing such a switch, the energy store is thus shiftable into a state appropriate to the particular situations without an additional user input or a signal generated elsewhere.

It is preferably provided for such purpose that the switch is situated on an outer side of the energy store. Such an arrangement yields the advantage that the switch is particularly easily switchable by mechanical contact when inserting the energy store into a guide.

In another example embodiment, it is provided that the switch is spring-loaded. Such a spring-loaded switch may preferably be designed as a push-button switch. Providing a spring-loaded switch results in a first basic state for the energy store via the pre-tensioning of the switch, in which the energy store is connected when the energy store is inserted into the guide, and a second basic state when the energy store is not inserted into the guide. Such a spring-loaded switch is preferably pre-tensioned in such a way that the switch is pressable in the direction of the energy store by inserting the energy store into the guide. The energy store is particularly preferably switchable via the logic circuit into an active state when the switch is pushed in. This means that the energy store is shiftable via the logic circuit into the passive state when the switch is moved away from the energy store due to the spring load and the energy store is situated outside the guide.

According to another example embodiment of the present invention, it is provided that the storage cell is electrically connected to the charge distribution circuit and to the logic circuit, respectively. Providing an electrical connection between the logic circuit and the storage cell yields the advantage that the logic circuit is permanently supplied with an operating voltage via the storage cell. In this way, the logic circuit is able to generate logic signals regardless of the state of the energy store and/or of the state of the storage cell management system. These independently generated logic signals are preferably directed to the charge distribution circuit, as a result of which the energy store is shiftable into the active or into the passive state. The storage cell is particularly preferably electrically connected permanently to the charge distribution circuit and to the logic circuit, respectively. In another advantageous specific embodiment, it is provided that the logic circuit is directly connected to one or to multiple of the storage cell(s) of the energy store.

In a more detailed embodiment of the present invention, it is provided that in the active state, an electrical voltage is present at a voltage output of the energy store and that in the passive state, no electrical voltage is present at the voltage output of the energy store. The application or switch-off of the electrical voltage at the voltage output is preferably effectuated by the charge distribution circuit, the logic circuit directing a control signal to the storage cell management system and the switching of state taking place via the storage cell management system. The fact that no electrical voltage is present in the passive state yields the further advantage that in the passive state the energy store is not dischargeable via the voltage output.

Moreover, it is provided according to one embodiment of the present invention that the logic circuit always remains in an active state. In this way, the logic circuit is excluded from the switching of the energy store between the passive and the active state. This yields the advantage that a switching of the energy store via the logic circuit into the active state may also take place when the energy store is in the passive state.

In one example embodiment of the present invention, it is provided that the energy store is switchable into the passive state by fulfilling a condition predefined in the charge distribution circuit. Such a condition may, for example, be the undershooting of a predefined load current at a voltage output of the energy store or, for example, also at a voltage input of the storage cell management system. The end of a certain time period, in which no charge has been drawn from the energy store, may also be predefined as a condition. This yields the advantage that the energy store is switchable into the passive state, even if the switch is not actuated and the predefined condition is achieved.

In one refinement of this embodiment, it is provided that when actuating the switch, a pulse-like control signal is generatable for switching via the logic circuit from the passive state into the active state. Because the actuation of the switch allows a pulse-like control signal to be generated by the logic circuit for switching from the passive state into the active state, this yields the advantage that the energy required to activate the energy store is very low.

Moreover, it is provided in another form of this embodiment that the pulse-like control signal is conductible to the storage cell management system via an input voltage line. Such an input voltage line may, for example, be a line via which the energy store is chargeable. Utilizing the input voltage line for conveying the pulse-like control signal yields the advantage that the number of lines required for operating an energy store switchable into a passive state or into an active state is reduced.

In one alternative embodiment, it is provided that a control signal for switching between the active state and the passive state is generatable via the logic circuit. The logic circuit preferably switches the storage cell management system in accordance with the switch position of the switch using the control signal, as a result of which the energy store is shiftable into the respective state. In this way, it is advantageously ensured that the energy store is always in a state corresponding to the switch position of the switch. The control signal is particularly preferably continuous.

In one refinement of these embodiments, it is provided that the switch is made of a non-conductive material. Such a material may, for example, be a plastic. The fact that the switch is made of a non-conductive material yields the advantage that the logic circuit and additional circuits in the energy store are electrically insulated against the guide with respect to a connection that could be established between the energy store and the guide via the presence of the switch on the guide. Thus, it may be largely ensured that the guide is largely voltage-free due to a contact of the switch with the guide. This affects, in particular, a housing of the guide.

In one alternative refinement of the aforementioned embodiments, it is provided that a load current is conductible via the switch to the charge distribution circuit. In this case, a charging contact of the energy store is preferably utilized as a switch. A spring-loaded charging contact of the energy store is particularly preferably utilized as a switch in this case. This alternative refinement yields the advantage that no separate element is required to be provided for switching the energy store between the passive state and the active state.

An energy storage system is also the subject matter of the present invention, which includes an energy store according to one of the above described embodiments or refinements of these embodiments, the energy storage system including a guide and the energy store being insertable into the guide. By providing a guide for the energy store, the energy store is advantageously held in the guide. This takes place preferably by a form fit or a force fit. An additional advantage results from the fact that when inserted into the guide, the switch is actuated as a result of contact with the guide. Thus, when inserted into the guide, the energy store is switched directly from the passive state into the active state. Alternatively, the energy store may also be brought into contact with the guide in a different manner. The energy store may, for example, be designed in such a way that the energy store is engageable with the guide in such a way that the energy store is inserted, set or screwed into the guide.

In one embodiment of the energy storage system, it is provided that the switch of the energy store is pressed when the energy store is in a position inserted in the guide. This embodiment yields the advantage that the logic circuit, which is preferably connected to the switch, is always in a state corresponding to the switch position of the switch.

Another embodiment of the energy storage system provides that the switch of the energy store is not pressed if the energy store is outside the guide. This becomes advantageous, in particular, if a pre-tensioned switch such as, for example a spring-loaded switch or a push-button switch is preferably used for the switch. Thus, according to this other embodiment of the energy storage system, it is ensured that with such a switch as described above, the energy store in a state outside the guide is switchable via the logic circuit into the passive state, without the need for further handling, for example, by the user. To prevent, according to this embodiment, the energy storage system from being activated by an inadvertent pressing of the switch when the energy store is outside the guide, it may be provided that the switch is blocked or secured in a position outside the guide of the energy store.

According to another embodiment of the energy storage system, it is provided that the guide includes a holder for a vehicle, in particular, a holder for a handlebar of a two-wheeler. By providing a holder, the energy storage system and, in particular, the energy store, is attachable to a handlebar of a two-wheeler. Thus, the energy stored in the energy storage system, for example, for electrical consumers, is available on the two-wheeler. Such electrical consumers may be lights, mobile telephones, navigation devices or other electrical consumers, which are normally mounted in the area of a handlebar of a two-wheeler, preferably of a bicycle. The holder includes, in particular, a mounting option for a mobile telephone. There is also the advantage that as a result of such a mounting of the energy storage system, a charging system is able to charge an energy store inserted into the guide through the guide and via a charging contact. A part of such a charging system may preferably be a dynamo, in particular a hub dynamo, which is mounted on the front wheel of the two-wheeler. The guide may alternatively include an electrical input for a charging voltage.

Additional features, details and advantages of the present invention result the following description of exemplary embodiments with reference to the figures.

DETAILED DESCRIPTION OF EXAMPLE EMBODIMENTS

Figure 1:
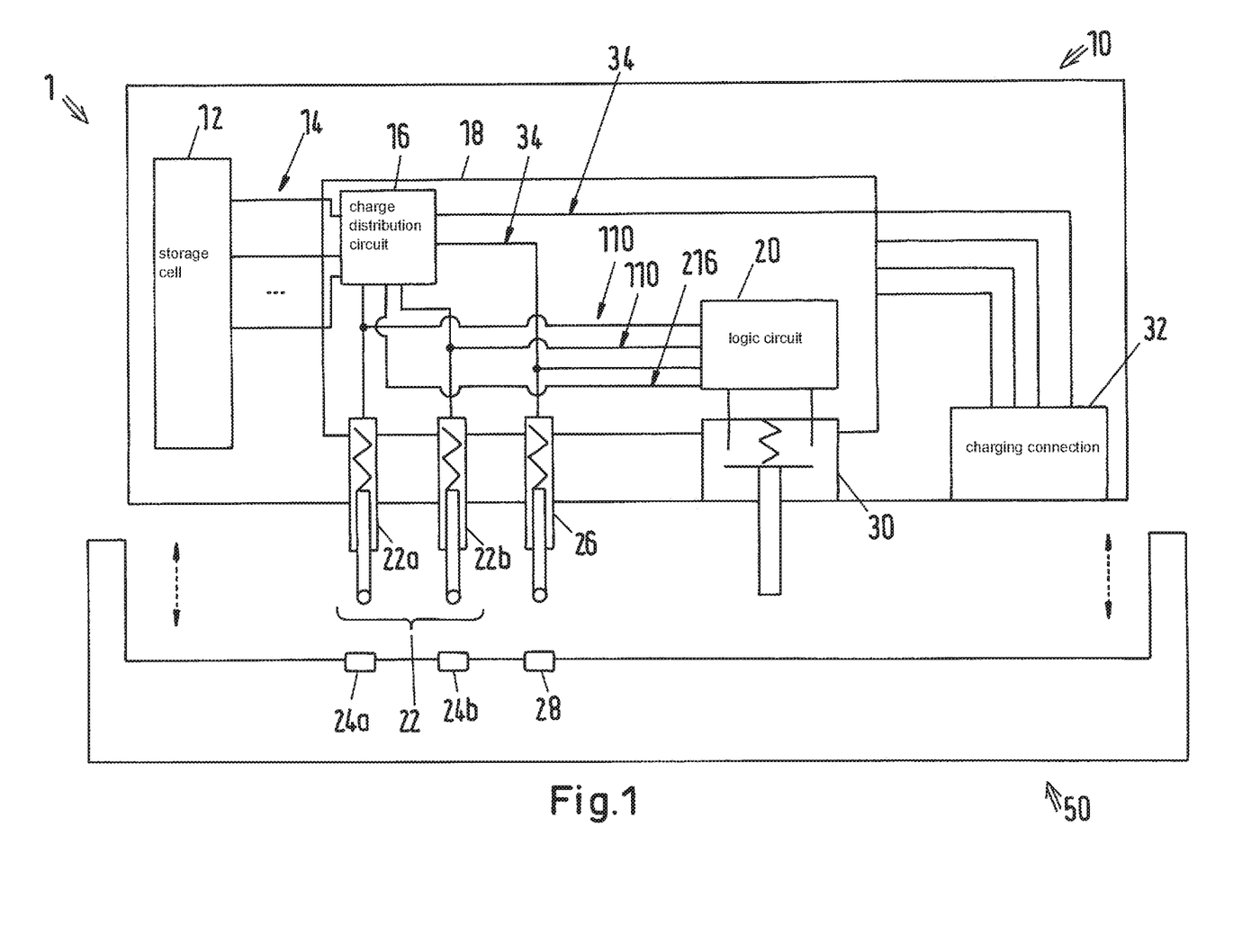
FIG. 1 schematically shows a block diagram of the energy storage system including the guide and the energy store, as well as the electrical components situated in the energy store.

FIG. 1 schematically shows a representation of an energy storage system 1 including an energy store 10 and a guide 50. Energy store 10 includes at least one storage cell 12, the at least one storage cell 12 being electro-conductively connected to a charge distribution circuit 16 via storage cell line 14.

Charge distribution circuit 16 is part of a storage cell management system 18, which effectuates the charging and discharging of the at least one storage cell 12, as well as the transfer of energy store 10 from an active state into a passive state. For this purpose, storage cell management system 18 includes a logic circuit 20.

When energy store 10 is inserted into guide 50, a voltage output 22 including outputs 22a, 22b of energy store 10 is overlapped by contacts 24 of guide 50, thereby enabling an electrical contact between contacts 24a, 24b and voltage output 22. Energy storage system 1 may also include a charging input 26, which may be overlapped by a charging contact 28 when energy store 10 is inserted into guide 50. Voltage output 22 may be designed as a DC voltage output, a first output 22a having an electrical potential relative to a second output 22b and one of the two outputs, preferably second output 22b, having ground potential.

In this exemplary embodiment, the elements forming voltage output 22 and charging input 26 are situated on an outer side of energy store 10, which is located on a side facing guide 50 when energy store 10 is inserted into guide 50.

The elements forming voltage output 22 and charging input 26 are preferably designed as spring contacts, which include a mechanical pre-tensioning and which compress as soon as they are overlapped by contacts 24 or with charging contact 28.

Logic circuit 20 further includes a switch 30. This switch 30 may be designed as a separate switch according to one specific embodiment (cf. FIGS. 1, 2, 5) or may be integrated into charging input 26 (cf. FIGS. 2, 3, 6). The integration of switch 30 into charging input 26 is further explained below with reference to FIGS. 3, 4, 6.

According to FIG. 1, energy store 10 further includes a charging connection 32, which may be provided alternatively or in addition to charging input 26. Both charging connection 32 as well as charging input 26 are connected via two separate charging lines 34 to charge distribution circuit 16 of storage cell management system 18.

The provision of a charging connection 32 has the advantage that energy store 10 is chargeable via charging connection 32 in a position outside guide 50 without a charging option having to be connected to charging input 26.

Energy store 10 is inserted into guide 50. Energy store 10 may alternatively also be set, inserted or screwed into guide 50 or engaged in a similar manner with guide 50. Energy store 10 is engaged in any case with guide 50 in such a way that a form-fit or force-fit connection is established between energy store 10 and guide 50, and contacts 24 correspond to voltage output 22 and, if necessary, charging contact 28 corresponds to charging input 26.

Figure 5:
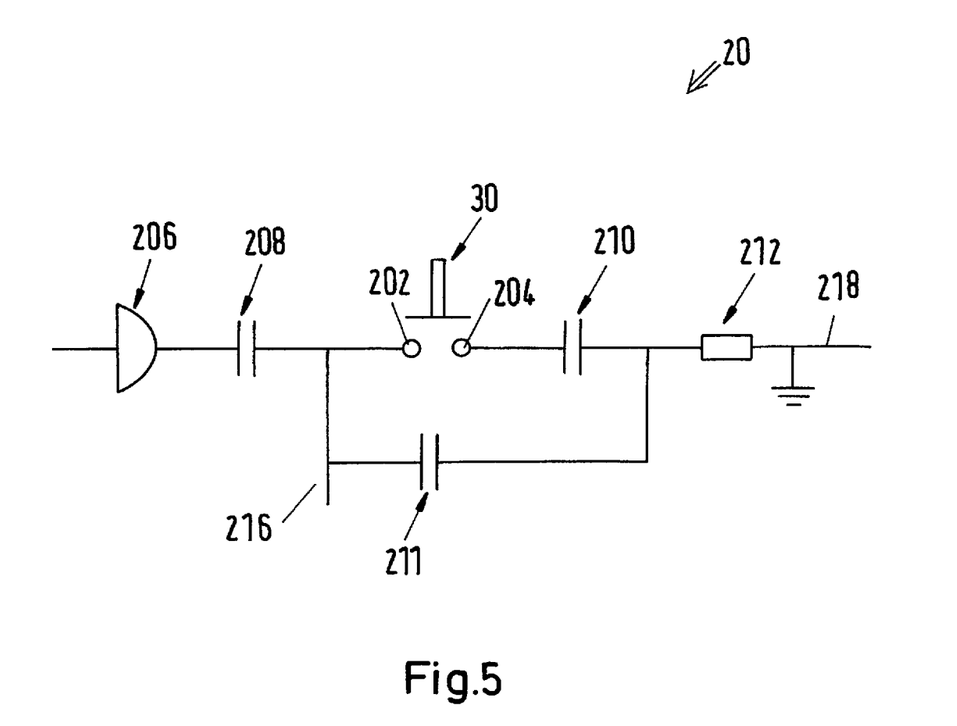
FIG. 5 shows a partially schematic representation of a circuit diagram of an alternative embodiment of the logic circuit.
Figure 6:
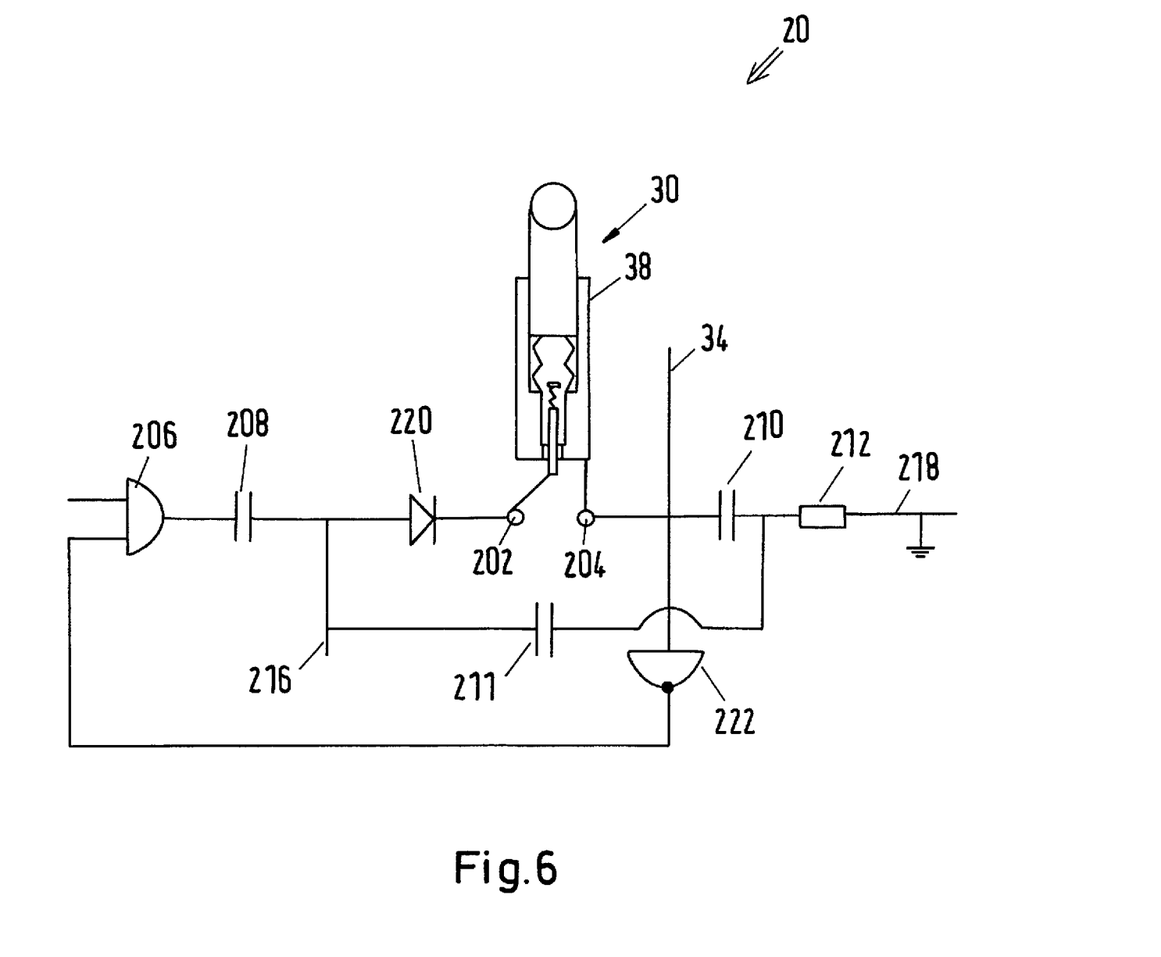
FIG. 6 shows a refinement of the alternative embodiment of the logic circuit in a partially depicted circuit diagram in a schematic layout.

In one embodiment of energy store 10 according to FIG. 5 or FIG. 6, it is provided that a signal line 216 inside storage cell management system 18 connects charge distribution circuit 16 to the logic circuit. A signal generated by logic circuit 20 is used for the switching of energy store 10 by storage cell management system 18 into an active state or into a passive state.

Figure 2:
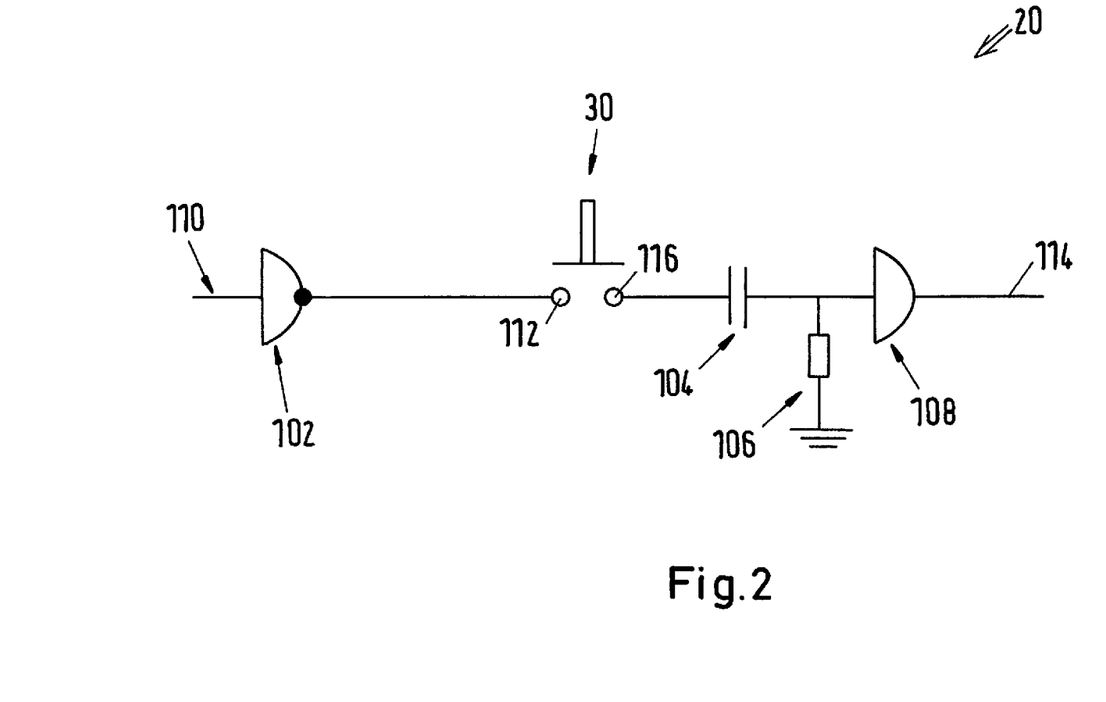
FIG. 2 shows a partially simplified representation of the logic circuit

FIG. 2 shows logic circuit 20 according to a first embodiment of energy store 10. Logic circuit 20 according to this embodiment includes a NAND gate 102, a capacitor 104, a resistor 106 and an AND gate 108, as well as switch 30.

Logic circuit 20 according to the first embodiment of energy store 10 is permanently supplied with current from the at least one storage cell 12 of energy store 10. In this way, logic circuit 20 is unaffected by the state of energy store 10, regardless of whether active state or passive state.

The power supply of logic circuit 20 is not depicted in the schematic FIG. 2. The output voltage of charge distribution circuit 16, which is conducted from voltage output 22, is present at feed line 110 of the logic circuit. The voltage present at feed line 110 is compared with the supply voltage of logic circuit 20 with the aid of NAND gate 102, so that a high-level is present at first switch contact 112 of switch 30 when the energy store is in the passive state. There is namely no voltage present at voltage output 22 in the passive state, whereas the voltage of the at least one storage cell 12 is present at the perpetual power supply, which is not depicted in FIG. 2. The high level results for first switch contact 112 due to the logic of NAND gate 102.

In the event that energy store 10 is in the active state, a low-level will be present at first switch contact 112, since the output voltage of charge distribution circuit 16 is present at voltage output 22 and thus at feed line 110 and the voltage of the at least one storage cell 12 is present at the perpetual power supply, which is not depicted in FIG. 2. The low-level results for first switch contact 112 due to the logic of NAND gate 102.

An output 114 of AND gate 18 is connected to charging line 34. Switch 30 is opened in the passive state of energy store 10. Capacitor 104 is therefore not charged and a low level is present at output 114 of logic circuit 20, since the input of AND gate 108 is connected via a resistor 106 to ground.

When energy store 10 is inserted into guide 50, switch 30 then closes, as a result of which first contact 112 and second contact 116 of logic circuit 20 are connected. By closing switch 30, the high level of first contact 112 is then also present at second contact 116, provided energy store 10 is in the passive state.

Since the voltage of capacitor 104 is unable to abruptly change, the capacitor plates of capacitor 104 are initially drawn to the high level of the output of NAND gate 102. This high level is therefore also present at the input of AND gate 108. The level of output 114 of logic circuit 20 therefore changes from a low level to a high level after switch 30 is closed. Capacitor 104 subsequently discharges via resistor 106, so that the voltage to ground at the capacitor plate connected to AND gate 108 decreases to zero. The capacitor plate connected to switch 30 remains unchanged at the high level of the output of NAND gate 102.

The product of the capacitance of capacitor 104 and of the resistance value of resistor 106 determines a time constant, with which the voltage at the input of AND gate 108 reaches a low level. By selecting a suitable capacitance for capacitor 104 and a suitable resistance value for resistor 106, it may be ensured that the voltage at the input of AND gate 108 remains sufficiently long at the high level, thus, the voltage at output 114 of AND gate 108 also remains sufficiently long at the high level so that charge distribution circuit 16 experiences a stable high level voltage on charging line 34 connected to charging input 26, since this charging line 34 is directly connected to output 114 of AND gate 108.

According to this exemplary embodiment according to FIG. 2, charge distribution circuit 16 is configured in such a way that when a high level voltage is present on one of the charging lines 34, charge distribution circuit 16 switches energy store 10 into the active state.

Accordingly, a high level or the voltage of voltage output 22 of charge distribution circuit 16 is present at feed line 110 of logic circuit 20 after switch 30 is switched, since energy store 10 is in the active state.

NAND gate 102 then outputs at its output and thus at first switch contact 112 a low level due to the logic of NAND gate 102. The result of this low level is that a capacitor plate of capacitor 104 on the switch side abruptly adjusts to the low level, while the voltage difference between the two capacitor plates of capacitor 104 remains initially unchanged. Capacitor 104 is then further discharged via resistor 106 until the voltage (to ground) reaches the value zero at the capacitor plate of capacitor 104 on the AND gate side.

Once the voltage at the input of AND gate 108 has dropped to a low level, the signal at output 114 of AND gate 108 changes from a high level to a low level. This switch of voltage at output 114 has no effect on charge distribution circuit 16, since charge distribution circuit 16 responds only to a voltage change from a low level to a high level in order to switch energy store 10 from the passive state into the active state.

By providing such a logic circuit 20, it need merely be ensured that at the output of AND gate 108, a stable high level is present at output 114 after the closing of switch 30 for a period of time that is determined by the coordination of the characteristic values of capacitor 104 and of resistor 106.

In this case, the combination between capacitor 104 and resistor 106 is selected in such a way that the high level generated by logic circuit 20 is present sufficiently long that it is processable if the level has been conveyed via one of charging lines 34 to charge distribution circuit 16.

According to the embodiment according to FIG. 2, charge distribution circuit 16 will reset energy store 10 into the passive state by achieving a suitable condition after switch 30 is opened.

Such a condition may, for example, be the undershooting of a certain discharge current at voltage output 22 or the end of a time span, in which no charge has been drawn from the energy store. Further conditions attributable to the fact that no charge has been drawn from energy store 10 are also conceivable.

If charge distribution circuit 16 has returned energy store 10 to the passive state when switch 30 is opened, then the initial condition for logic circuit 20 according to this exemplary embodiment according to FIG. 2 is present again.

Figure 3:
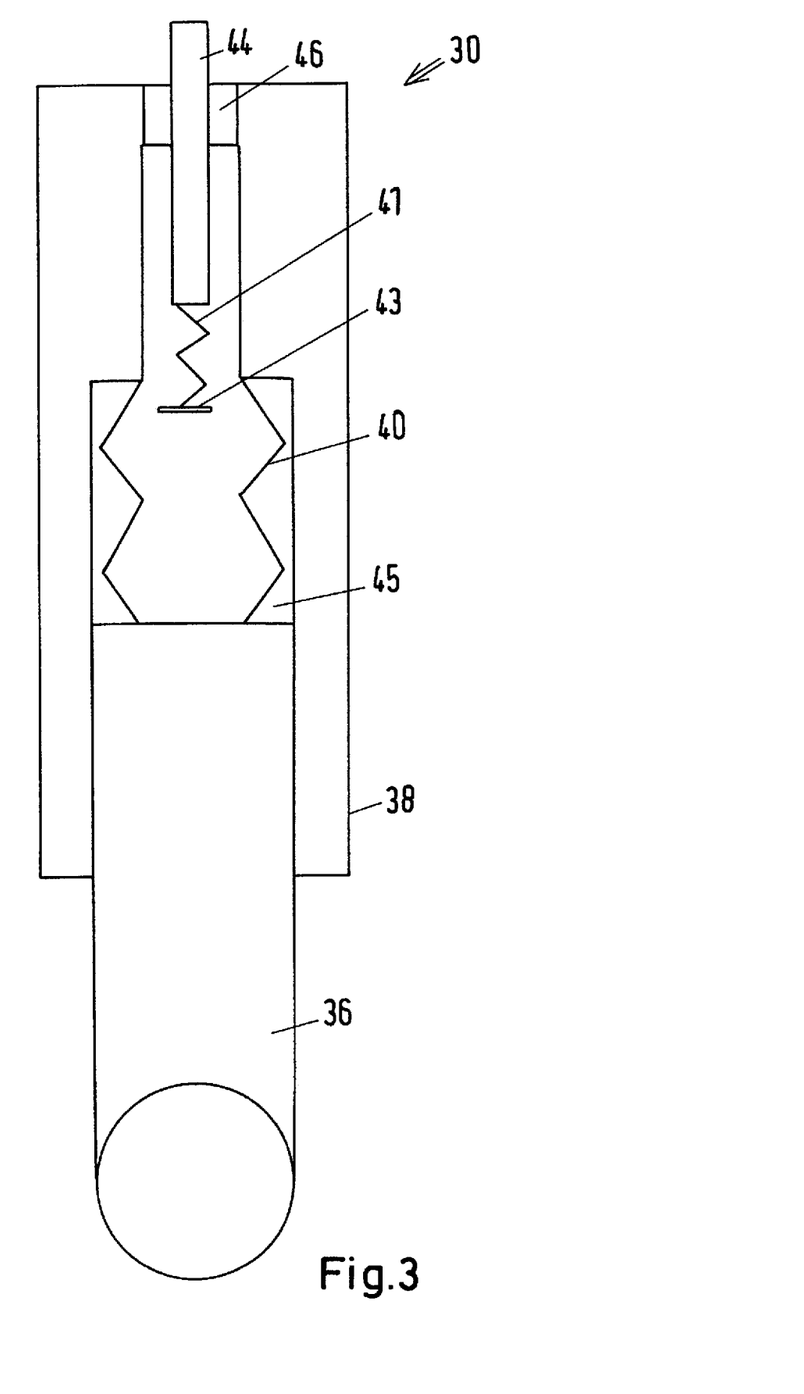
FIG. 3 schematically shows a representation of a switch, in particular, of a push-button switch.

FIG. 3 shows a switch 30 according to one refinement of the embodiments. This switch 30 is designed as a spring-loaded push-button switch and may act simultaneously as a contact, in particular, as a charging input 26.

For this purpose, switch 30 provides a contact part 36, which is mounted in a spring-loaded manner in a cylinder body 38. Contact part 36 is conductively connected to cylinder body 38. At least one electro-conductive spring 40 is permanently connected on one axial side to contact part 36 and on another axial side to cylinder body 38.

Switch 30 further includes a seating pin 44, which is connected permanently, but not conductively to cylinder body 38 via an insulating part 46 in an area opposite contact part 36 of switch 30. A contact spring 41 is situated on seating pin 44 at the interior end thereof, a small contact surface 43 being situated on the side of contact spring 41 opposite seating pin 44, which protrudes into large cylinder space 45 of cylinder body 38.

A switch 30 designed in such a way now includes two switch contacts, namely on the outer side of seating pin 44 and on the outer side of cylinder body 38.

A connection between cylinder body 38 and seating pin 44 is simultaneously established when contact part 36 is inserted into cylinder body 38 to the point that contact part 36 and small contact surface 43 come into contact. A corresponding contact surface is preferably provided in this case on the side of contact part 36 facing small contact surface 43.

If such a switch 30 is inserted as a charging input 26 of an energy store 10, as described in FIG. 1, then an input voltage is conductible via switch 30 that forms the charging input 26, in particular, via its cylinder body 38, at charging line 34 connected to charging input 26, which is connected to charge distribution circuit 16.

Similarly, according to FIG. 3, a contact connected by switch 30 as a function of the position of energy store 10 relative to guide 50 is interrupted via the interaction of small contact surface 43 with contact part 36.

Figure 4:
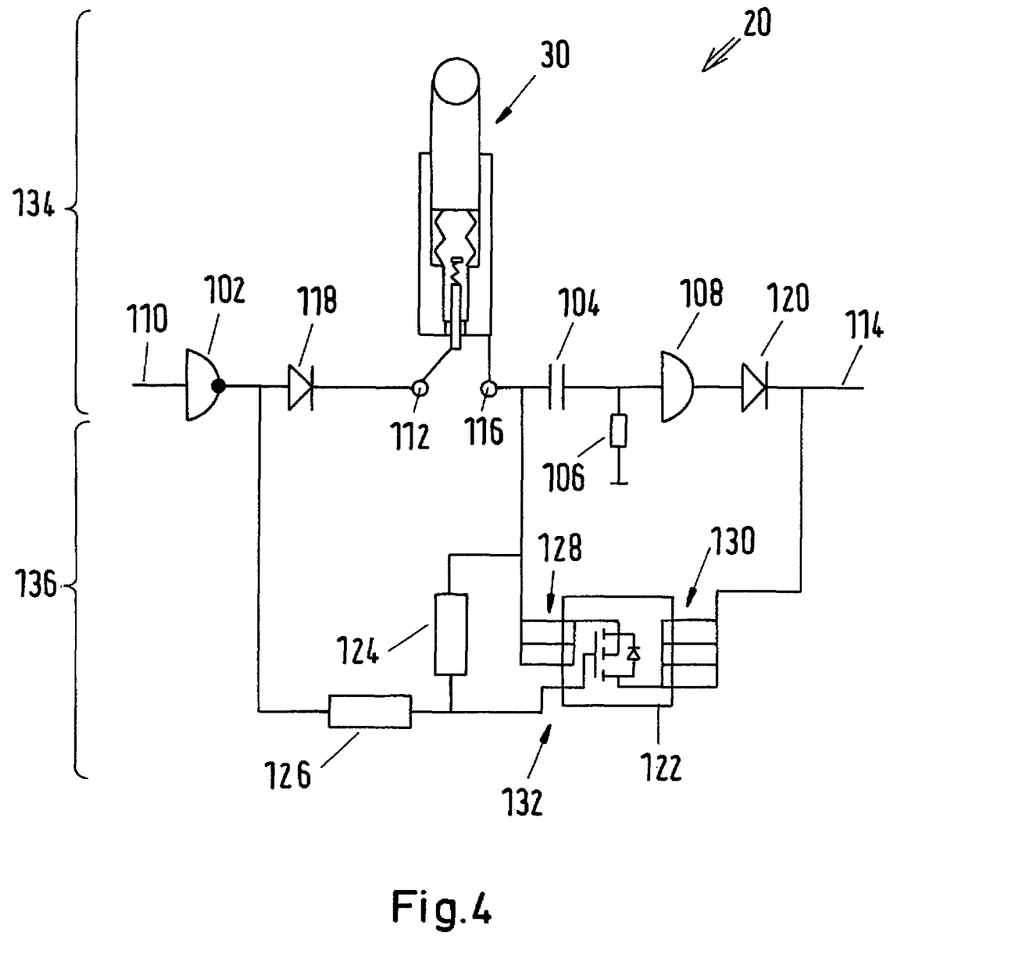
FIG. 4 shows a partial representation of a circuit diagram of a refinement of one embodiment of the logic circuit.

FIG. 4 schematically shows a circuit diagram of a refinement of one embodiment of logic circuit 20 including switch 30 according to FIG. 3.

First switch contact 112 of logic circuit 20 according to this exemplary embodiment is connected at seating pin 44 of switch 30. Second switch contact 116 is connected to cylinder body 38 of switch 30. This logic circuit 20 further includes AND gate 108 and NAND gate 102, as well as capacitor 104 and resistor 106. A first diode 118 is located between NAND gate 102 and first switch contact 112. A second diode 120 is located between output 114 and AND gate 108.

First switch contact 112 is interconnectable via switch 30 with second switch contact 116, while switch 30 is simultaneously usable as charging input 26. For this purpose, switch 30 includes contact part 36, which may be overlapped by charging contact 28 of guide 50 (cf. FIGS. 1 and 3).

According to the refinement of logic circuit 20 according to FIG. 4, the power supply of logic circuit 20, similar to logic circuit 20 according to FIG. 2, is not depicted.

Logic circuit 20 according to FIG. 4 further includes a transistor 122 and a first resistor 124 connected upstream in front of transistor 122 and a second resistor 126 connected upstream in front of transistor 122.

Transistor 122 is designed as a p-channel MOSFET and includes a source channel 128, a drain channel 130 and a gate 132. Gate 132 is connected to the output of NAND gate 102 via second resistor 126.

When energy store 10 is inserted into guide 50, then upper area 134 of the circuit according to FIG. 4, which includes NAND gate 102, first diode 118, first switch contact 112, second switch contact 116, capacitor 104, resistor 106, AND gate 108, second diode 120 and output 114 and is connected to charging line 34 (not depicted) which is connected to charging input 26, produces a voltage pulse. This voltage pulse is then present at output 114 of upper area 134.

Diodes 118 and 120 in this case are in the passage, the voltage drop at diodes 118 and 120 having no effect on the logic components of logic circuit 20 according to the exemplary embodiment in FIG. 4.

If the induced voltage pulse has a high level for a sufficiently long period of time, then a high level is present at the feed line of NAND gate 102, since energy store 10 has been shifted by this voltage pulse into the active state. A low level is present at the output of NAND gate 102 and thus also at first switch contact 112 due to the NAND gate logic. Capacitor 104 then continues to discharge via resistor 106 until the voltage (to ground) at the capacitor plate of capacitor 104 on the AND gate side reaches the value zero.

Once the voltage at the input of AND gate 108 has dropped to a low level, the signal at output 114 of AND gate 108 changes from a high level to a low level. This switch of the voltage at output 114 has no effect on charge distribution circuit 16, since charge distribution circuit 16 responds only to a voltage change from a low level to a high level in order to switch energy store 10 from the passive state into the active state.

If a charging voltage, because it is used simultaneously as charging input 26 in the exemplary embodiment according to FIG. 4, is applied at switch 30, then the voltage from first switch contact 112 and from second switch contact 116 changes to a high level, since switch contacts 112 and 116 are connected to one another when energy store 10 is inserted into guide 50.

A renewed voltage pulse is initially generated via AND gate 108 via capacitor 104, which is present at output 114 (cf. the explanations relating to FIG. 2). At the same time, a voltage drop is present between source channel 128 and gate 132, which is so large that transistor 122 becomes conductive. Thus, a conducting of a charging voltage, which is present at charging input 26 (in FIG. 1) and at contact part 36 (in FIG. 3), at cylinder body 38 and finally at second contact 116, takes place via transistor 122 to output 114.

Energy store 10 is charged from this point in time directly with the charging voltage present at switch 30 or charge input 26 as long as the charging voltage is high enough to keep transistor 122 conductive. Capacitor 104 is then further discharged via resistor 106 until the voltage (to ground) at the capacitor plate of capacitor 104 on the AND gate side reaches the value zero. This means, that after a certain time following the application of a charging voltage to contact part 36 of switch 30, the voltages at the input and the output of AND gate 108 have the value zero, while the full charging voltage is present at capacitor 104 and at diode 120.

The dimensioning of first resistor 124 and of second resistor 126 must ensure that source channel 128 and drain channel 130 are electronically insulated from one another in the event energy store 10 is in the passive state, i.e., in the event a low level is present at feed line 110.

The dimensioning of resistors 124 and 126 must further ensure that in the active state of energy store 10, source channel 128 and drain channel 130 are electronically insulated from one another, in the event no charging voltage is present at charging input 26.

It may be provided, for example, that first resistor 124 has a value of 100 kΩ and second resistor 126 has a value of 4.7 kΩ. The embodiment of transistor 122 is also selected by way of example to be a p-channel MOSFET.

FIG. 5 shows a partial representation of logic circuit 20 according to another embodiment of logic circuit 20 according to another exemplary embodiment.

Logic circuit 20 according to FIG. 5 shows a switch 30, via which a first switch contact 202 and a second switch contact 204 are connectable to one another. Logic circuit 20 according to this exemplary embodiment further includes an AND gate 206 as well as a first capacitor 208. A second capacitor 210, as well as a resistor 212, are also situated on the circuit side of second switch contact 204. A third capacitor 211 is situated with one side between second capacitor 210 and resistor 212 and with another side at a signal line 216. Signal line 216 is situated with one end between first capacitor 208 and first switch contact 202. The other end of resistor 212 is connected to ground 218.

The power supply voltage, i.e., a high level, is continuously present at the inputs of AND gate 206 (only one input is depicted in FIG. 5). Thus, a high level is continuously present on the output side of AND gate 206. As described below, the level of signal line 216 when switch 30 is opened is also a high level as a result of the corresponding charging of the capacitor plates of first capacitor 208. No current flows through the circuit side of second switch contact 204 when switch 30 is opened.

If the capacitance ratio of first capacitor 208 to third capacitor 211 is selected in such a way that it is significantly greater than 1, then a high level present at the output of AND gate 206 drops mainly at third capacitor 211 in a stationary state when switch 30 is opened, due to the serial connection of capacitors 208 and 211. This means that the voltage at signal line 216 is also a high level.

When energy store 10 is inserted into guide 50, switch 30 is then closed, as a result of which first switch contact 202 and second switch contact 204 are connected to one another. The voltage at the output of AND gate 206 remains at a high level.

As a result of the electrical contact between switch contacts 202 and 204, a stationary state occurs in logic circuit 20, the voltage at the output of AND gate 206 being distributed to first capacitor 208 and to the parallel connection of second capacitor 210 and of third capacitor 211.

The capacitance of the parallel connection of second capacitor 210 and of third capacitor 211 corresponds to the sum of the capacitances of these two capacitances, the voltage at second capacitor 210 being equal to the voltage at third capacitor 211 due to the parallel connection.

The ratio of the voltage at first capacitor 208 to the voltage at second capacitor 210 is a function of the ratio of the capacitance of first capacitor 208 to the capacitance of the parallel connection of second capacitor 210 and of third capacitor 211.

When the capacitance ratio of the capacitance of first capacitor 208 to the sum of the capacitances in the parallel connection made up of second capacitor 210 and third capacitor 211 is selected in such a way that it is significantly less than 1, then the high level at the output of AND gate 206 drops mainly at first capacitor 208. The result of this is that a low level is present at first switch contact 202 and also on signal line 216.

If the condition in the case of the open contact between contact points 202 and 204 is considered, then it must hold overall that the capacitance ratio of first capacitor 208 to third capacitor 211 is selected in such a way that it is significantly greater than 1 and the capacitance ratio of the capacitance of first capacitor 208 to the sum of the capacitances in the parallel connection made up of second capacitor 210 and of third capacitor 211 is selected in such a way that it is significantly smaller than 1.

With the circuit according to the embodiment according to FIG. 5, the level of signal line 216 is a function of the switching state of switch 30. If switch 30 is switched, then the level of signal line 216 is a low level. If switch 30 is not switched, then the level of signal line 216 is a high level.

Signal line 216 is connected to charge distribution circuit 16 within storage cell management system 18. If a high level is present on signal line 216, then charge distribution circuit 16 will shift energy store 10 into the passive state based on a logic present in charge distribution circuit 16.

Similarly, charge distribution circuit 16 shifts energy store 10 into the active state when a low level is present on signal line 216.

The result is, therefore, that energy store 10 is always in the passive state when switch 30 is open and, similarly, energy store 10 is always in the active state when switch 30 is closed.

FIG. 6 shows one refinement of the second embodiment of logic circuit 20. The second embodiment of logic circuit 20 on which the refinement according to FIG. 6 is based, is depicted in FIG. 5.

In FIG. 6, charging line 34 connected to charging input 26 is directly connected to second switch contact 204. Furthermore, logic circuit 20 according to FIG. 6 includes a diode 220 between signal line 216 and first switch contact 202. In addition, logic circuit 20 includes a NAND gate 222 between charging line 34 and an input of AND gate 206.

When energy store 10 is not inserted into guide 50, then switch 30 is opened. In this way, a low level is on charging line 34, which means that a high level is present at the output of NAND gate 222. This is the case since a high level is permanently present at a second input not depicted of NAND gate 222, which may be provided, for example, by a voltage of the at least one storage cell 12.

In this way, one of the inputs of AND gate 206 has a high level. The other input of AND gate 206, exactly like the input of NAND gate 222 not depicted, is connected at a high level such as, for example, the voltage of storage cell 12.

Thus, a high level is also present at the output of AND gate 206, as a result of which first capacitor 208 and third capacitor 211 are charged. No current flows through the circuit side of second switch contact 204 when switch 30 is opened.

If the capacitance ratio of first capacitor 208 to third capacitor 211 is selected in such a way that it is significantly greater than 1, then a high level present at the output of AND gate 206 drops mainly at third capacitor 211 in a stationary state when switch 30 is opened. This means that the voltage at signal line 216 is also a high level.

When energy store 10 is inserted into guide 50, switch 30 then closes, as a result of which an electrical contact is established between first switch contact 202 and second switch contact 204.

As long as no voltage is present on cylinder body 38 of switch 30 such as, for example, a charging voltage introduced via charging input 26, the voltage at the output of NAND gate 222 remains at a high level, even in the case of a closed switch 30.

The output voltage of AND gate 206 is distributed approximately on first capacitor 208 and the parallel circuit of second capacitor 210 and of third capacitor 211, since the small forward voltage of diode 220 may be ignored.

If the capacitance ratio of the capacitance of first capacitor 208 to the sum of the capacitances in the parallel circuit made up of second capacitor 210 and third capacitor 211 is selected in such a way that it is significantly smaller than 1, then the high level at the output of AND gate 206 drops mainly at first capacitor 208.

Accordingly, the voltage on signal line 216 becomes low level.

If the condition in the case of the open contact between contact points 202 and 204 is considered, then it must hold overall that the capacitance ratio of first capacitor 208 to third capacitor 211 is selected in such a way that it is significantly greater than 1 and the capacitance ratio of the capacitance of first capacitor 208 to the sum of the capacitances in the parallel circuit made up of second capacitor 210 and third capacitor 211 is selected in such a way that it is significantly smaller than 1. Moreover, the forward voltage of diode 220 must be negligible.

In a charge distribution circuit 16 according to the explanations with respect to FIG. 5, charge distribution circuit 16 switches energy store 10 into the active state when a low level is present at signal line 216.

This means that energy store 10 is switched into the active state by switch 30, which is closed when energy store 10 is inserted into guide 50.

Diode 220 is initially blocking if a charging voltage is applied in this active state to charging input 26, which is formed by contact part 36 of switch 30 in this exemplary embodiment.

Moreover, the voltage at the output of NAND gate 222 becomes low level, since a high level is present at its input. As a result, a low level is also formed at the output of AND gate 206 according to the explanations above.

The result of this is that first capacitor 208 discharges via the low impedance output of AND gate 222, so that after some time voltage no longer prevails at first capacitor 208.

Consequently, a low level is present on signal line 216, even if a charging voltage is present at charging line 34. The passive state of energy store 10 is achieved only if switch 30 is opened and voltage is no longer present at charging line 34. That is, when energy store 10 is withdrawn from guide 50 and is not charged. During the optional charging operation (presence of a charging voltage at charging line 34 connected to charging input 26), the entire charging voltage is present at diode 220 and at capacitor 210 in the stationary state.

The present invention is not limited to one of the previously described specific embodiments, but is modifiable in a variety of ways.

All features and advantages, including structural details, spatial configurations and method steps arising from the from the description and from the figures may be essential to the present invention, both alone and in a wide variety of combinations.

What is claimed is:

1. An energy store, comprising:
   at least one storage cell; and
   a storage cell management system which includes a charge distribution circuit configured to monitor charging and discharging of the storage cell, the energy store being shiftable by the storage cell management system into an active state and into a passive state, wherein the storage cell management system includes a logic circuit including a switch for switching the energy store between the passive state and the active state, the switch configured to be switched by inserting the energy store into a guide, wherein the logic circuit includes:
   a cylinder body having a first end and a second end, a contact part mounted via an opening of the first end in a spring-loaded manner, the contact part being conductively connected to the cylinder body, an electro-conductive spring connected to the contact part and to the cylinder body, an insulating part, a seating pin connected to the cylinder body in a non-conductive manner via the insulating part, a contact spring situated on the seating pin, and a contact surface situated on a side of the contact spring opposite the seating pin, a first switch contact being disposed on an outer side of the seating pin, and a second switch contact being disposed on an outer side of the cylinder body.

2. The energy store as recited in claim 1, wherein the switch is situated on an outer side of the energy store.

3. The energy store as recited in claim 1, wherein the storage cell is electrically connected to the charge distribution circuit and to the logic circuit, respectively.

4. The energy store as recited in claim 1, wherein an electrical voltage is present at a voltage output of the energy store in the active state and no electrical voltage is present at the voltage output of the energy store in the passive state.

5. The energy store as recited in claim 1, wherein the logic circuit always remains in an active state.

6. The energy store as recited in claim 1, wherein the energy store is switchable into the passive state by fulfilling a condition predefined in the charge distribution circuit.

7. The energy store as recited in claim 1, wherein the logic circuit is configured to generate a pulse-like control signal for switching from the passive state into the active state when actuating the switch.

8. The energy store as recited in claim 7, wherein the pulse-like control signal is conductible via a charging line to the storage cell management system.

9. The energy store as recited in claim 1, wherein the logic circuit is configured to generate a control signal for changing between the active state and the passive state.

10. The energy store as recited in claim 1, wherein the switch is made of a non-conductive material.

11. The energy store as recited in claim 1, wherein a charging current is conductible via the switch to the charge distribution circuit.

12. An energy storage system, comprising:

an energy store including at least one storage cell, and a storage cell management system which includes a charge distribution circuit configured to monitor charging and discharging of the storage cell, the energy store being shiftable by the storage cell management system into an active state and into a passive state, wherein the storage cell management system includes a logic circuit including a switch for switching the energy store between the passive state and the active state, the switch configured to be switched by inserting the energy store into a guide; and the guide, the energy store being insertable into the guide, wherein the guide includes a holder for a two-wheeler, wherein the logic circuit includes:

a cylinder body having a first end and a second end, a contact part mounted via an opening of the first end in a spring-loaded manner, the contact part being conductively connected to the cylinder body, an electro-conductive spring connected to the contact part and to the cylinder body, an insulating part, a seating pin connected to the cylinder body in a non-conductive manner via the insulating part, a contact spring situated on the seating pin, and a contact surface situated on a side of the contact spring opposite the seating pin, a first switch contact being disposed on an outer side of the seating pin, and a second switch contact being disposed on an outer side of the cylinder body.

13. The energy storage system as recited in claim 12, wherein the switch of the energy store is compressed when the energy store is in a position inserted in the guide.

14. The energy storage system as recited in claim 12, wherein the switch of the energy store is not compressed when the energy store is outside the guide.

* * * * *